(12) United States Patent
Neamatollahi et al.

(10) Patent No.: US 10,524,308 B2
(45) Date of Patent: Dec. 31, 2019

(54) METHOD FOR DECENTRALIZED CLUSTERING IN WIRELESS SENSOR NETWORKS

(71) Applicants: Peyman Neamatollahi, Mashhad (IR); Mahmoud Naghibzadeh, Mashhad (IR); Saeid Abrishami, Mashhad (IR)

(72) Inventors: Peyman Neamatollahi, Mashhad (IR); Mahmoud Naghibzadeh, Mashhad (IR); Saeid Abrishami, Mashhad (IR)

(73) Assignees: Peyman Neamatollahi, Mashhad (IR); Ferdowsi University of Mashhad, Mashhad (IR); Mahmoud Naghibzadeh, Mashhad (IR); Saeid Abrishami, Mashhad (IR)

(*) Notice: Subject to any disclaimer, the term of this patent is extended or adjusted under 35 U.S.C. 154(b) by 0 days.

(21) Appl. No.: 15/994,515

(22) Filed: May 31, 2018

(65) Prior Publication Data
US 2019/0098693 A1    Mar. 28, 2019

(51) Int. Cl.
*H04W 84/20* (2009.01)
*H04L 29/08* (2006.01)
*H04W 4/38* (2018.01)

(52) U.S. Cl.
CPC ............. *H04W 84/20* (2013.01); *H04L 67/12* (2013.01); *H04W 4/38* (2018.02)

(58) Field of Classification Search
CPC .................................................. H04W 84/20
See application file for complete search history.

(56) References Cited

U.S. PATENT DOCUMENTS

| | | |
|---|---|---|
| 6,829,222 B2 | 12/2004 | Amis et al. |
| 7,035,240 B1 | 4/2006 | Balakrishnan et al. |
| 7,203,729 B2 | 4/2007 | Chen et al. |
| 8,055,740 B2 | 11/2011 | Kim et al. |
| 8,134,950 B2 | 3/2012 | Pun |
| 8,605,694 B2 | 12/2013 | Park et al. |
| 2008/0109536 A1 | 5/2008 | Hong et al. |

(Continued)

OTHER PUBLICATIONS

Peyman Neamatollahi et al., "Distributed Clustering-Task Scheduling for Wireless Sensor Networks Using Dynamic Hyper Round Policy," IEEE Transactions on Mobile Computing, vol. 17, No. 2, Feb. 2018 (pp. 334-347).

(Continued)

*Primary Examiner* — Kevin M Cunningham
(74) *Attorney, Agent, or Firm* — NovoTechIP International PLLC

(57) ABSTRACT

An improved method of clustering wireless sensor networks includes selecting cluster heads in the network based on a score calculated for each node. The score is calculated based on one or more predetermined criteria of each node and determines which node is selected as a cluster head among one or more nodes in the vicinity of each other. As a result, the score of each cluster head node at the time of its selection is higher than or the same as its cluster node members. Moreover, the cluster heads may be selected such that they are not located in close proximity to each other and are fairly distributed in the environment. The duration of this decentralized clustering process is finite and predetermined and does not depend on the number of nodes and the size of the network.

18 Claims, 10 Drawing Sheets

(56) References Cited

U.S. PATENT DOCUMENTS

| | | |
|---|---|---|
| 2011/0128131 A1 | 6/2011 | Kim et al. |
| 2014/0237095 A1* | 8/2014 | Bevilacqua-Linn ........................ H04L 43/0817 709/223 |
| 2015/0215853 A1* | 7/2015 | Ling ................... H04W 64/003 370/254 |
| 2016/0088447 A1* | 3/2016 | Fraser ..................... H04M 1/00 370/336 |
| 2016/0143077 A1* | 5/2016 | Fodor ................... H04W 76/14 370/329 |

OTHER PUBLICATIONS

Neamatollahi et al., "Fuzzy-based Clustering-task Scheduling for Lifetime Enhancement in Wireless Sensor Networks," IEEE Sensors Journal, vol. 17, No. 20, 6837-6844, Oct. 15, 2017.

\* cited by examiner $$S_1^{CH-nbr} = \emptyset$$
$$S_2^{CH-nbr} = \{(1,80)\}$$
$$S_3^{CH-nbr} = \{(1,80)\}$$
$$S_4^{CH-nbr} = \{(1,80)\}$$
$$S_5^{CH-nbr} = \emptyset$$
$$S_6^{CH-nbr} = \emptyset$$
$$S_7^{CH-nbr} = \emptyset$$
$$S_8^{CH-nbr} = \emptyset$$

$$S_1^{CH-nbr} = \emptyset$$
$$S_2^{CH-nbr} = \{(1,80), (5,67)\}$$
$$S_3^{CH-nbr} = \{(1,80)\}$$
$$S_4^{CH-nbr} = \{(1,80)\}$$
$$S_5^{CH-nbr} = \emptyset$$
$$S_6^{CH-nbr} = \{(5,67)\}$$
$$S_7^{CH-nbr} = \{(6,67)\}$$
$$S_8^{CH-nbr} = \emptyset$$

$$S_1^{CH-nbr} = \emptyset$$
$$S_2^{CH-nbr} = \{(1,80),(5,67)\}$$
$$S_3^{CH-nbr} = \{(1,80)\}$$
$$S_4^{CH-nbr} = \{(1,80)\}$$
$$S_5^{CH-nbr} = \emptyset$$
$$S_6^{CH-nbr} = \{(5,67)\}$$
$$S_7^{CH-nbr} = \{(6,67)\}$$
$$S_8^{CH-nbr} = \emptyset$$

METHOD FOR DECENTRALIZED CLUSTERING IN WIRELESS SENSOR NETWORKS

TECHNICAL FIELD

The present application relates generally to forming clusters in a wireless sensor network (WSN), and more particularly to an improved method of decentralized clustering in a WSN.

BACKGROUND

Wireless sensor networks generally include a large number of nodes with sensing, computing, and wireless communication capabilities. These networks can be used in a variety of industries, such as health care, pollution monitoring, and target tracking systems. To prolong the network lifetime and efficiently manage a WSN, the nodes in the network are generally formed into clusters. One node in each cluster is then selected as the cluster head. The cluster head can be selected randomly or based on certain criteria. A selection based on predetermined criteria, however, can significantly lengthen the lifetime of a network. As a result, many different clustering methods have been developed in recent years.

Some of these clustering methods select cluster heads without giving regards to the amount of energy needed and used by each node. These methods employ a probability function to select cluster heads, which often does not require a lot of energy for the clustering process. However, these clustering approaches do not choose the appropriate cluster head to maximize the network lifetime. In contrast, some cluster head selection methods take into account the nodes' energy to select the best cluster heads. However, a large number of messages need to be exchanged between various nodes during such clustering approaches.

Some of the recently developed cluster head selection algorithms are distributed. These methods generally require partial knowledge of environmental conditions. On the other hand, some methods need global knowledge of network nodes to create the best clusters. These methods are, in general, centralized. The centralized approaches, however, are not applicable to large-scale WSNs, because gathering all information for each node is a time and energy-consuming task.

Therefore, a need exists for a more flexible and energy-efficient cluster head selection method in wireless sensor networks.

SUMMARY

A method for clustering a wireless sensor network having at least a first node and a second node is disclosed. In one implementation, the method includes calculating a waiting time for the first node, setting a cluster head field for the first node to empty, determining if a message is received at the first node during at least one of a clustering period or the waiting time of the first node, upon receiving the message, determining if the message is a cluster head message from the second node; upon receiving a cluster head message from the second node, storing information contained in the cluster head message from the second node into the cluster head field, determining if the cluster head field is empty after the end of the waiting time of the first node, upon determining that the cluster head field is empty after the end of the waiting time of the first node, sending a cluster head message to the second node and setting the first node as a cluster head, and upon determining that the cluster head field of the first node is not empty at an end of a clustering period, setting the first node as a regular member of one of a cluster in the wireless sensor network.

A node in a wireless network having at least a first node and a second node is disclosed. In one implementation, the node includes a processing unit, and a memory readable by the processing unit. The memory may comprise instructions stored thereon to cause the processing unit to: calculate a waiting time for the first node; set a cluster head field for the first node to empty; determine if a message is received over the wireless network and at the first node during at least one of a clustering period or the waiting time of the first node; upon receiving the message over the wireless network and at the first node, determine if the message is a cluster head message from the second node; upon receiving a cluster head message from the second node of the wireless network, store in the memory information contained in the cluster head message from the second node into the cluster head field; determining if the cluster head field is empty after the end of the waiting time of the first node; upon determining that the cluster head field is empty after the end of the waiting time of the first node, send a cluster head message to the second node and set the first node as a cluster head; and upon determining that the cluster head field of the first node is not empty at an end of a clustering period, set the first node as a regular member of a cluster in the wireless network.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

Figure 1:
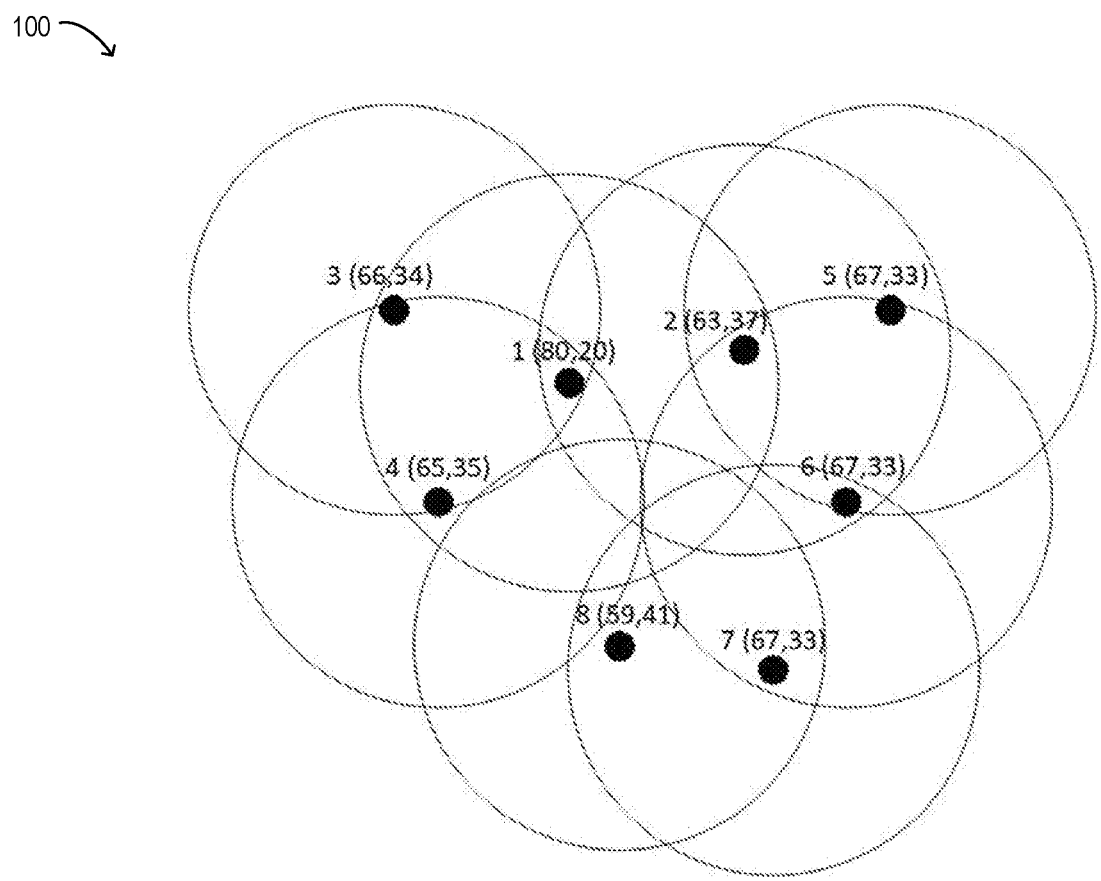
FIG. 1 is an example topology in a wireless sensor network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Many approaches exist for clustering WSNs and for selecting cluster heads within the clusters. Most of these approaches, however, are not suitable for use with large networks for a variety of reasons. For example, because centralized clustering methods are performed at the base station, they are difficult to perform for large networks, as collecting all the necessary information at the base station requires a large amount of time and energy and can turn the base station into a bottleneck system. In distributed clustering methods, on the other hand, the determination of whether a node should be a cluster head or a regular node is generally based on information from neighboring nodes (local information), such as the number of neighboring nodes, the amount of energy remaining in the nodes, and the distance to the neighboring nodes. Gathering this information involves the exchange of a large number of messages between the nodes. This requires a large amount of energy.

Moreover, in most clustering methods, the cluster heads are usually selected based on probability functions, instead of being selected based on their merits. Furthermore, in current clustering processes, it is likely that parts of the network will not be covered by the clustering process. As a result, some nodes may not become clustered. These nodes generally have to send any data they collect from the environment directly to the base station. Because of this, such nodes usually deplete their energy quickly. Therefore, one of the design challenges in forming clusters is that the clustering method organizes all the nodes in the clusters.

Another issue with currently clustering methods is that the selected cluster heads are not evenly distributed in the environment. This means that some cluster heads may be located close to each other and/or within each other's cluster ranges. This may waste their energy because of interfering waves or re-transmitting of data. On the other hand, some nodes in the cluster may be too far from their cluster head, thus requiring a large amount of energy to communicate with their cluster head.

Moreover, the amount of time required for clustering a WSN, using currently available clustering techniques generally varies with the number of nodes in the network. For example, in some distributed clustering methods, a node waits for neighboring nodes to decide on its role in the cluster (i.e., normal node or cluster head). The problem with most of these methods is the dependence of their time of convergence to the size of the network (the path with the highest number of jumps). Such methods are often not scalable due to large amount of time required for clustering large networks. Furthermore, most currently used clustering methods require a large number messages to be exchanged, thus requiring a large energy overhead.

A solution is proposed here to solve these issues and more by providing an improved method of decentralized clustering in WSNs in which cluster heads are selected based on certain criteria and clusters are formed such that each node belongs to only one cluster. To determine the node's merit, a scoring system is developed, and the node with the highest score is selected as a cluster head in each neighborhood. As a result, the score of each cluster head node at the time of its selection is higher than or the same as its cluster node members. Moreover, the cluster heads may be selected such that they are not located in close proximity to each other and are fairly distributed in the environment. In addition, the duration of this decentralized clustering process is finite and predetermined and does not depend on the number of nodes and the size of the network. Besides, significantly less messages need to be exchanged to form clusters and select the cluster heads.

In the improved method of decentralized clustering in WSNs, clustering is performed through a distributed process. Some of the objectives of the distributed clustering method are: (1) simplifying the clustering process without the use of probability functions when choosing a cluster head; (2) dividing the network nodes into sets of clusters with a distributed method that meets the desired requirements for the network; (3) appropriate distributing clusters in the sensing environment in such a way as to reduce communication costs and improve scalability; (4) reducing the amount of time required for clustering a network and performing clustering in a fixed period of time, i.e. limiting the time complexity of the presented method to $O(1)$; and (5) reducing communication costs to reduce energy consumption and increase network lifetime by reducing the number of messages exchanged (i.e. limiting the message complexity of the presented method to $O(1)$ for each node).

FIG. 1 depicts an example wireless sensor network 100 which includes a number of nodes. These nodes include nodes 1, 2, 3, 4, 5, 6, 7, and 8. Based on the WSN requirements, each node in the WSN 100 may only be in communication with nodes in a specific range. The specific range may be predetermined. For example, the predetermined range for the nodes in WSN 100 is within the radius of the circle around each node (the node being at the center of the circle), and the size of the predetermined range is thus constant for all nodes. The first number in parentheses next to each node displays the score for the node and the second number displays the wait time (based on a selected unit of time) for each node, as will be described further below. The nodes in the communication range (cluster radius) of a node are considered as the neighboring nodes of that node. For example, the neighboring nodes of node 1 include nodes 2, 3, and 4.

Figure 2:
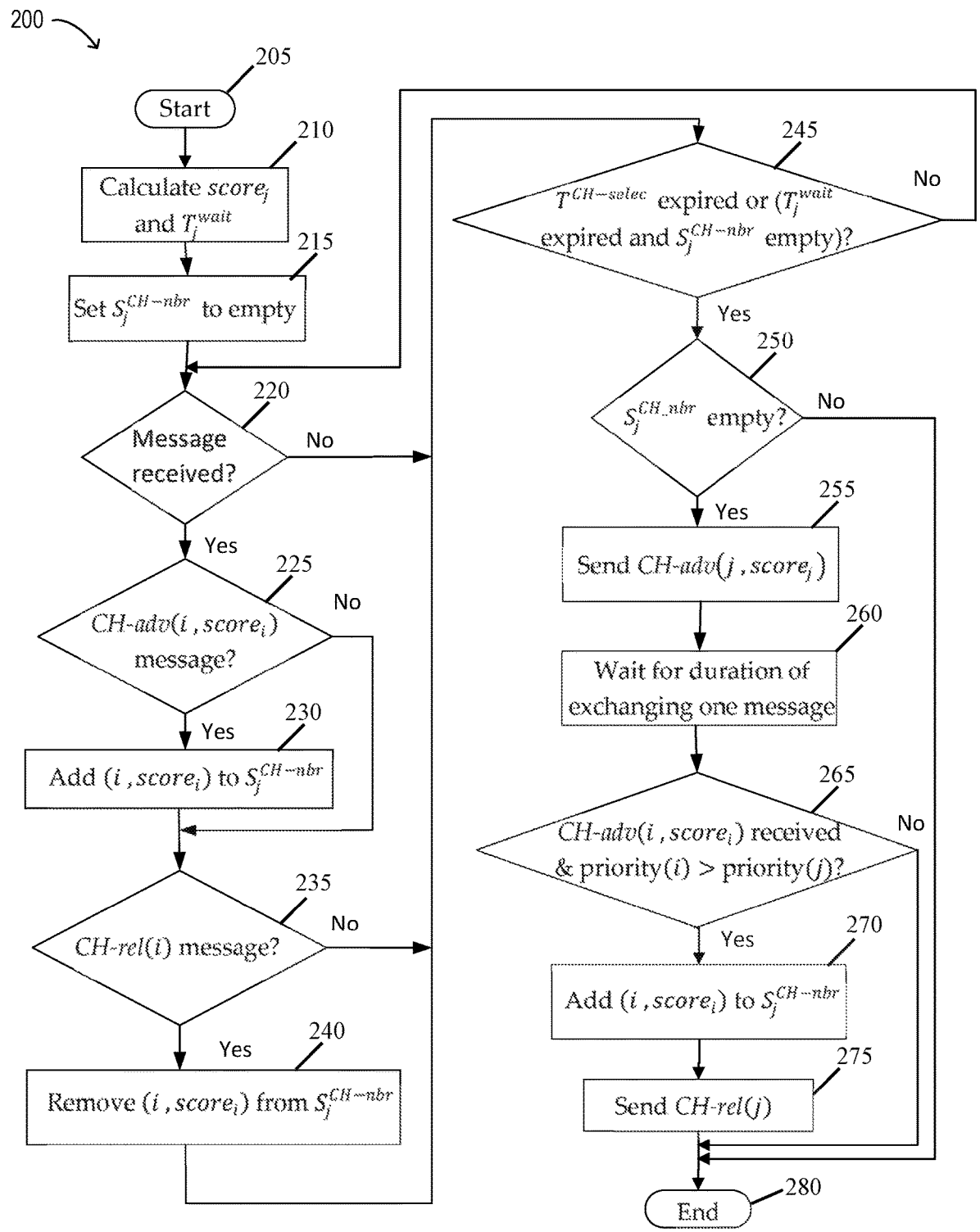
FIG. 2 is a flow diagram for an improved decentralized method of clustering a wireless sensor network.

FIG. 2 is a flow diagram depicting an exemplary method 200 for determining whether a node j in a WSN, having a number of nodes including nodes i and j, should be a cluster head. At 205, method 200 begins by proceeding to calculate, at 210, a score and a corresponding waiting time for node j. These may be referred to as $score_j$ and $T_j^{wait}$, respectively. The score for each node may be calculated based on a number of criteria, such as the amount of energy remaining in the node (e.g., battery life left), the number of adjacent nodes, the mobility of node, and the like. Other criteria may also be used in calculating the score, depending on the WSN and its application. Different methods may be employed to calculate the score. For example, the score can be considered as the current residual energy of the node divided by its total energy. In addition, it may be calculated based on multi criteria weighted formulas. In one implementation, the score is based on a zero to 100 ranking of each different criteria, with the final score being a number between zero and 100. The score of each node may indicate the suitability of the node for being a cluster head, with higher scores being associated with a more suitable node. After calculating the score, the node j calculates its expected wait time ($T_j^{wait}$) based on its score. The wait time is calculated based on the following relationship:

$$T_j^{wait} \propto \frac{1}{score_j} \qquad (1)$$

This shows that the wait time and the score have an inverse relationship. Thus, the higher the score of a node, the lower its require wait time. As a result, $T_j^{wait}$ shows the nodes with higher scores having a lower waiting time than the other nodes in their neighborhood. Because of the lower wait time, these nodes are more likely to be selected as a cluster head than other nodes in that neighborhood. On the contrary, lower score nodes have a smaller chance of being selected as cluster heads, as they have a longer delay in entering the competition, which gets started by nodes with higher scores. In this manner, the decentralized clustering method 200, can select cluster heads without relying on any probability functions. In one implementation, each node in the network calculates its score before participating in the cluster selection process.

After calculating a score for each node, the method 200 proceeds to have node j set the value of its cluster head field $S_j^{CH-nbr}$ to empty (or null), at 215. The cluster head field $S_j^{CH-nbr}$ may be used to store each node's adjacent cluster heads. This value is initially set to empty, before the cluster heads are selected. Alternatively, tables or other data structures may be used to store the adjacent cluster heads for each node.

The method 200 then proceeds to determine, at 220, if a message has been received by the node j. If a message has not been received, method 200 proceeds to step 245 to determine if a predetermined amount of time for selecting the cluster heads, $T^{CH-selec}$, has passed or the wait time, $T_j^{wait}$, is over and the value of the cluster head field, $S^{CH-nbr}$, is empty. In one implementation, the predetermined amount of time, $T^{CH-selec}$, is set for the entire network prior to the beginning of the clustering operation and is an amount of time given to the network to complete its clustering operation. This predetermined amount of time may be set such it is longer than the largest value $T^{wait}$ of each node in the network plus the amount of time it takes to send, receive, process, and respond to a message by each node. That is, for each node j:

$$T^{Msg-Pass} + T_j^{wait} \leq T^{CH-selec} \qquad (2)$$

This helps to limit the amount of time and energy spent on clustering operations, thus conserving resources and extending the lifetime of the network.

Referring back to step 245 of method 200, as long as $T^{CH-selec}$ is not completed, if the waiting time is not over or $S_j^{CH-nbr}$ is empty, node j waits at 220 to receive a message. When it is determined, at 220, that a message has been received, the method 200 proceeds to step 225 to determine if the message is a cluster head advertisement message. In one implementation, the cluster head advertisement message is labeled as a CH-adv message. When it is determined, at 225 that a CH-adv message has been received, the method 200 proceeds to insert information about the node received in the CH-adv message into the value of $S_j^{CH-nbr}$, at 230. In one implementation, the message includes the number (i.e., identification) of the node sending the message along with that node's score. This can be shown as (i, $score_i$) for a node i.

When it is determined that the message received is not a cluster head notification message, at 225, or after the value of the cluster head notification message has been inserted into the cluster head field $S_j^{CH-nbr}$, the method 200 determines if the node has received a cluster head release message, at 235. The cluster head release message may be labeled as a CH-rel(i) for a node i and may be a message indicating that a node is no longer a cluster head. If it is determined, at 235, that a release message has been received from a node i, the method 200 proceeds to remove the cluster head information from the cluster head field, $S_j^{CH-nbr}$, at 240, before proceeding to step 245 to determine if the total cluster formation time $T^{CH-selec}$ is over or the wait time for the node is over and the cluster head field is still empty. If neither one of these conditions is met, the method 200 returns back to step 220 to wait for the next message to arrive. However, if one of the conditions is met, at 245, this means that either the predetermined time for clustering is over or the wait time for the node is over, while no cluster head notification has been received from a neighboring node. The method 200 then proceeds to confirm, at 250, if the cluster head field is still empty.

When it is determined, at 250, that the cluster head field is not empty (i.e., it contains information about a cluster head node), the method 200 proceeds to end at step 280. This is because, if at the time that the clustering period has passed, the cluster head field contains information about a node, the current node becomes designated as a regular member of the cluster and need not perform any further functions in the clustering operation. However, if it is determined, at 250, that the cluster head field is empty, then the node sends, at 255, a cluster head notification message (CH-adv message) to all its neighboring nodes with the node's identification information and scoring data to indicate that the current node is a cluster head. This means that if by the end of the clustering period or the wait time, no cluster head node exists adjacent to the current node, then the current node can announce itself as a cluster head. It should be noted that in this phase, each cluster node can only send a CH-adv message once, at 255. The node then waits, at 260, for the time duration of exchanging a message (i.e., sending a message and receiving a response), before proceeding to step 265 to determine if the node has simultaneously received a cluster head notification message (CH-adv message) from another node. The time duration at 260 assures that the CH-adv messages from another neighbor nodes (if any) have been delivered to the current node.

When it is determined, at 265, that the node has received a cluster head notification message (during the waiting time at 260) and the node from which the message was received (i.e., the transmitter node) has a higher priority than the current node, the method 200 proceeds to add the information of the node received to the cluster head field, at 270. The priority determination may be based on the identification information of the node or other criteria. For example, the priority may be based on the number of the node, with lower number nodes having higher priority than higher number nodes (e.g., node 4 has a higher priority than node 5). The numbering may be determined in different ways, such as approaches based on hardware information. This is done so that there is a way to choose between nodes having the same wait time and same score. The method then proceeds to send a cluster head release message, at 275, to notify the neighboring nodes that it is no longer a cluster head, before proceeding to end the method at 280. When it is determined that no other cluster head notification message with higher priority has been received, at 265, then the method 200 simply proceeds to end. In this case, the current node remains a cluster head at the end of the procedure.

Because a node performing the method 200 has to wait till the node's wait time has expired before it can announce itself as a cluster head, nodes having lower wait times (which directly corresponds to nodes having higher scores) are more likely to become cluster heads. This is because the wait time for a node with a higher score is over sooner than the neighboring nodes with lower scores, and thus, such a node can introduce itself as the cluster head while there are still no cluster heads in its neighboring area.

Figure 3:
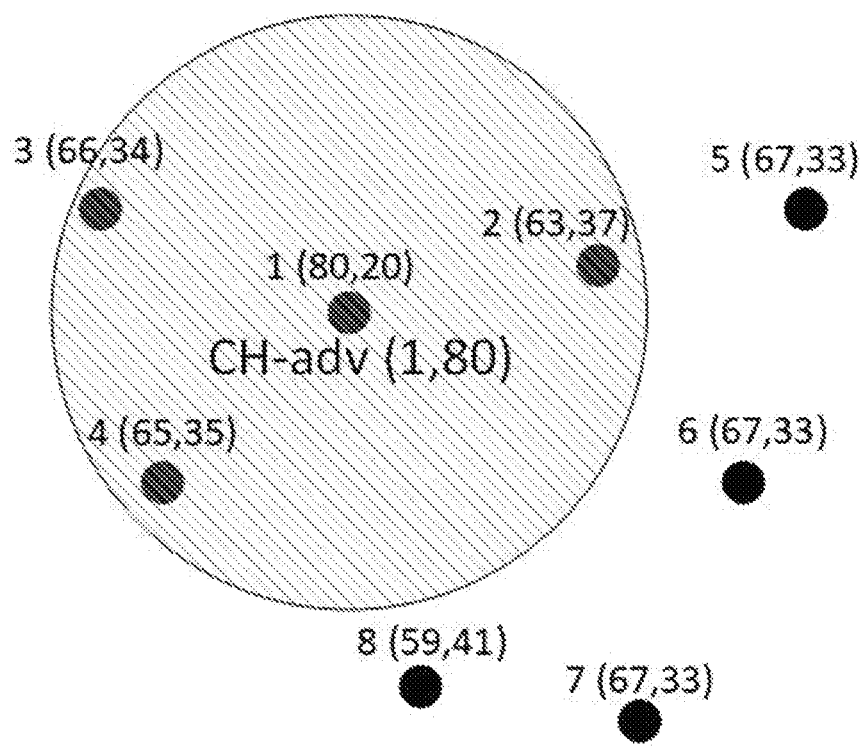
FIGS. 3-7 depicts various stages of the improved method of decentralized clustering as it is performed for the example wireless sensor network of FIG. 1.

FIGS. 3-7 depict various stages of an improved method of selecting cluster heads and decentralized clustering, such as the method 200, being performed for the example wireless sensor network 100 of FIG. 1. In the example of FIG. 3, since $S_1^{CH-nbr}$ is empty, node 1 reaches the end of its wait time (at 20 units of time since the start of the clustering operation), sooner than its other neighbors which have longer wait times (i.e., 34, 37, and 35). It should be noted that in FIGS. 1 and 3-7, it is assumed that the time it takes to send a message and receive a response to that message is equal to one time unit. Therefore, the wait time units are based on the amount of time it takes for nodes to send and receive a message. This may be different for different networks and can be predetermined or changeable by a user or administrator.

As the waiting time of node 1 is less than the waiting time for the other nodes, node 1 is able to send the CH-adv message first to its neighbors (nodes 2, 3 and 4), at step 255 of the method 200. The receiving nodes (nodes 2, 3, and 4) which are still in their waiting times (i.e., at step 245 of method 200), upon receiving the CH-adv message (i.e. (1,80) for (node 1, score$_1$)), insert the value (1, 80) in their $S^{CH-nbr}$ field. As a result, at the end of the waiting time for node 1, the nodes in its neighborhood, recognize node 1 as the cluster head, while the remaining nodes 5, 6, 7, and 8 (which have higher wait times) still have empty cluster head fields.

Figure 4:
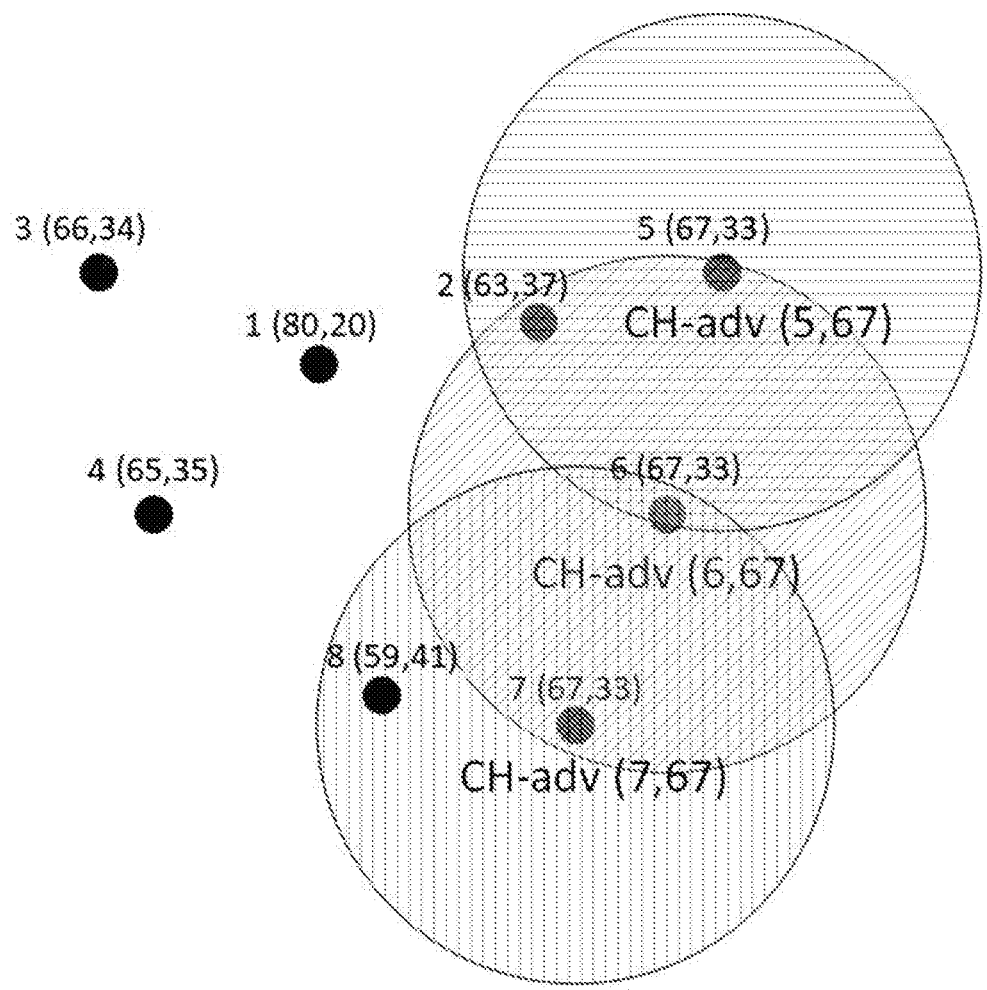

FIG. 4 depicts the stage in the clustering process when 33 units of time from the start of the clustering operation has passed. At this stage, nodes 5, 6, and 7 which have equal waiting time and higher scores than their other neighboring nodes reach the end of their waiting time, at the same time. In this case, all three nodes 5, 6, and 7 simultaneously send CH-adv messages to their neighboring nodes at step 255 of the method 200. Subsequently, nodes 5, 6, and 7 wait as much time as necessary to exchange a message, until the CH-adv messages reach their neighboring nodes. At this time, nodes 2 and 8 are in a state between steps 220 and 245 of the method 200. Therefore, upon receiving the cluster head messages CH-adv (5, 67) and CH-adv (6, 67) from nodes 5 and 6, node 2 adds the information from these two messages (i.e., (5, 67) and (6, 67)) to its cluster head field. Node 8, however (since it is only in the neighborhood of node 7), only receives the cluster head message CH-adv from node 7 and thus inserts the cluster head information (7, 67) into its cluster head field. It should be noted that the nodes 5, 6, and 7 are at step 260 of the method 200. Therefore, they do not insert the information of all received cluster head messages into their cluster head fields.

Figure 5:
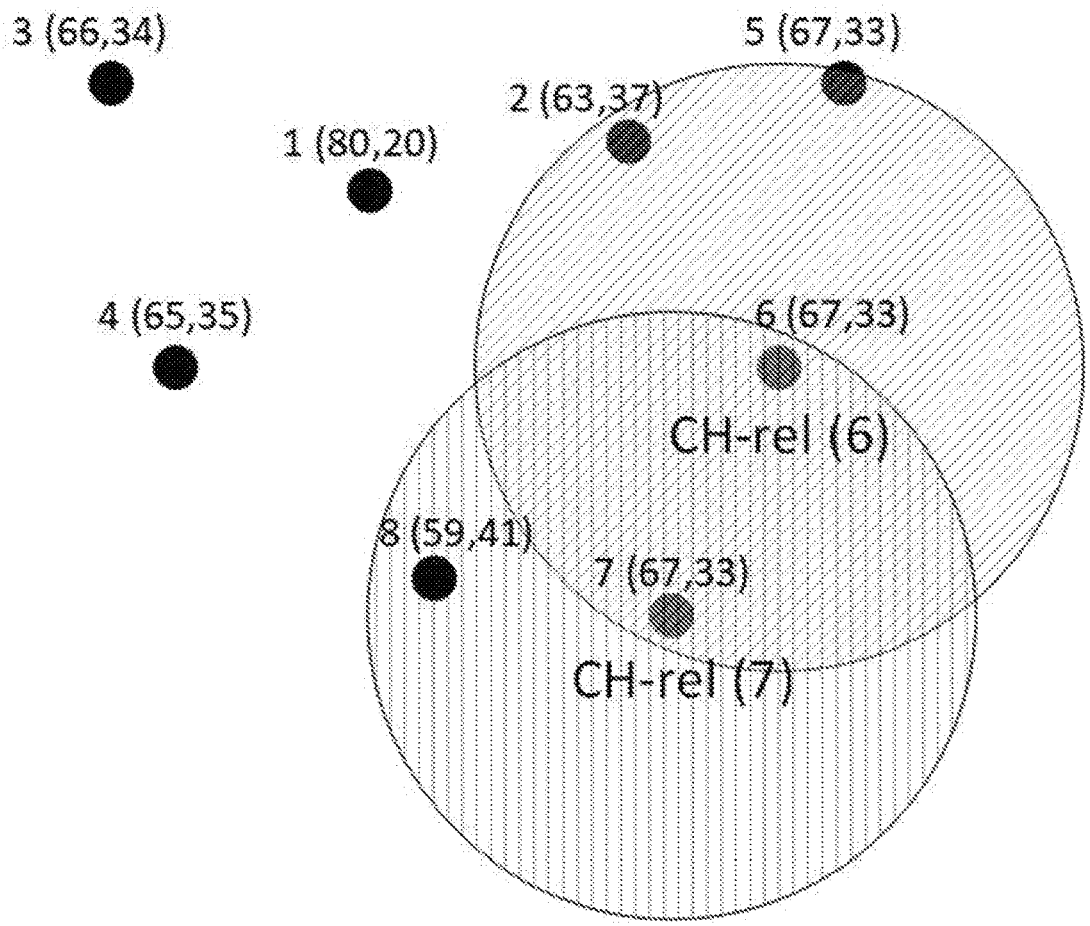

FIG. 5 depicts the next stage in the clustering process to determine a cluster head between the nodes 5, 6, and 7. As shown in FIG. 5, assuming that node 6 has a higher priority than node 7 and node 5 has a higher priority than node 6 (e.g., based on their numbers), at step 265 of the method 200, node 6 adds the information for node 5 (i.e., (5, 67)) and node 7 adds the information for node 6 (i.e., (6, 67)) to its cluster head field at step 270 of the method 200. Then, nodes 6 and 7 declare to their neighboring nodes by sending release messages, CH-rel (6) and CH-rel (7), that they are no longer cluster heads. Upon receiving the release messages, node 2 removes the information for node 6 (i.e. (6, 67)) and node 8 removes the information for node 7 (i.e., (7, 67)) from their cluster head fields.

Figure 6:
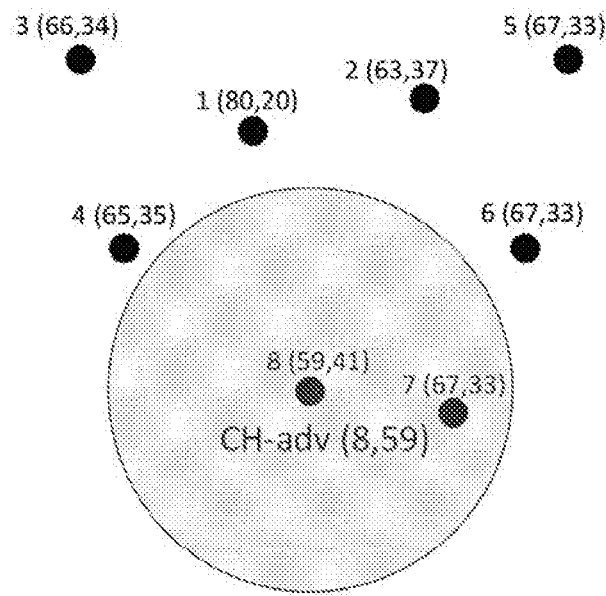

FIG. 6 depicts the stage in the clustering process when 41 units of time from the start of the clustering operation has passed. At this stage, node 8, which is not adjacent to any cluster heads, reaches the end of its waiting time, becomes a cluster head and sends a cluster notification message (CH-adv (8, 59)) to its neighboring nodes. That is because none of the cluster head nodes are in its neighborhood.

Therefore, usually in each neighborhood, nodes with a higher score are selected as the cluster head. On the other hand, when a node is in the vicinity of another node that has already been announced as a cluster head, it can no longer be selected as a cluster head. In other words, only a node whose waiting time has passed without identifying any other cluster heads in its vicinity can be selected as a cluster head. Such a node introduces itself as the cluster head once the waiting time is over. This causes the cluster heads to be evenly distributed in the network and not be in near vicinity of each other, thus reducing interference in their waves. Moreover, regular nodes can conserve energy by sending their data to cluster heads that are in their vicinity instead of having to transmit their data to cluster heads that are located in far distances from them. In this way, cluster heads are properly distributed in the network environment. This clustering method is thus easily scalable for large WSNs.

Figure 7:
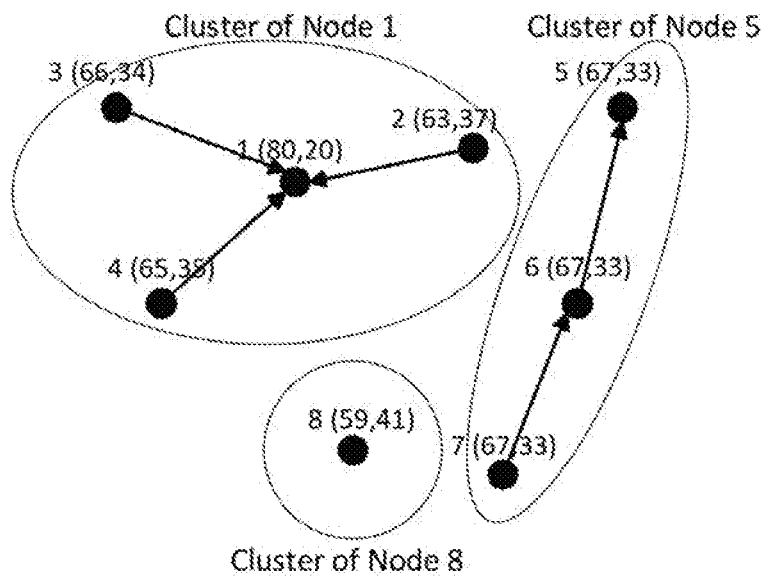

FIG. 7 depicts the ending stage of the clustering process. As shown, at the end of the predetermined clustering period, the cluster head fields for cluster head nodes, such as nodes 1, 5, and 8, have their cluster head fields still set to empty. On the other hand, the cluster head field for regular nodes such as, nodes 2, 3, 4, 6, and 7 contains one or more cluster head information. In one implementation, each regular node (for example, node j) simply selects the cluster head node that has the highest score among the nodes in its cluster head field as its next hop (cluster head or relay node) toward its cluster head and transmits its information to that node. Alternatively, each regular node may select its next hop from among its cluster head field based on one or more other predetermined criteria such as remaining energy, mobility, and so on. Thus, each regular node uses the information in its cluster head field to decide which cluster to join and does not need to exchange more messages to make this decision. For example, in FIG. 7, nodes 2 and 6 select cluster heads 1 and 5, respectively, while node 7 needs to use node 6 as a relay node to send information to node 5. In other words, whenever node 6 receives data from node 7, since the cluster head field of node 6 is not empty (i.e., node 6 is not a cluster head), it forwards the data to the next node on its route to the cluster head. Therefore, each regular node is a member of the cluster where the selected cluster head is located. It should be noted that with this clustering method, some clusters, such as cluster of node 1, will need only one hop to transmit all their data and some clusters, such as cluster of node 5, will need multi-hops to transmit all their data to the cluster head. Moreover, it may be possible that some clusters such as, cluster of node 8, only have one member.

In short, since the predetermined time for the clustering process, $T^{CH-selec}$, and the waiting time for a node, $T_j^{wait}$, are finite, after a limited period of time, a situation arises where the condition of step 245 of method 200 is satisfied. At this point, if the cluster head field, $S^{CH-nbr}$, is not empty, (i.e., there is at least one cluster head in the vicinity of node j), node j becomes a regular node and join one of the clusters. Otherwise, node j identifies itself as a cluster head node or, by executing steps 270 and 275 of method 200 opts to not become selected as the cluster head, and thus again becomes a regular node. Therefore, node j is selected as a cluster head node or a regular node during the predetermined time for the cluster formation process. Accordingly, the decentralized clustering method presented herein divides all nodes into distinct sets, with each set having one cluster head. The time required for performing the clustering operation in this distributed clustering method is independent of the number of nodes in the network. This means that the time complexity of the presented method is O(1). Moreover, in the worst case, a node will send up to two messages (CH-adv and CH-rel) in the selection process of the cluster head. Therefore, the number of messages exchanged for each node in the worst case is less than 2. This means that the message complexity of the presented method is O(1) for each node.

Figure 8A:
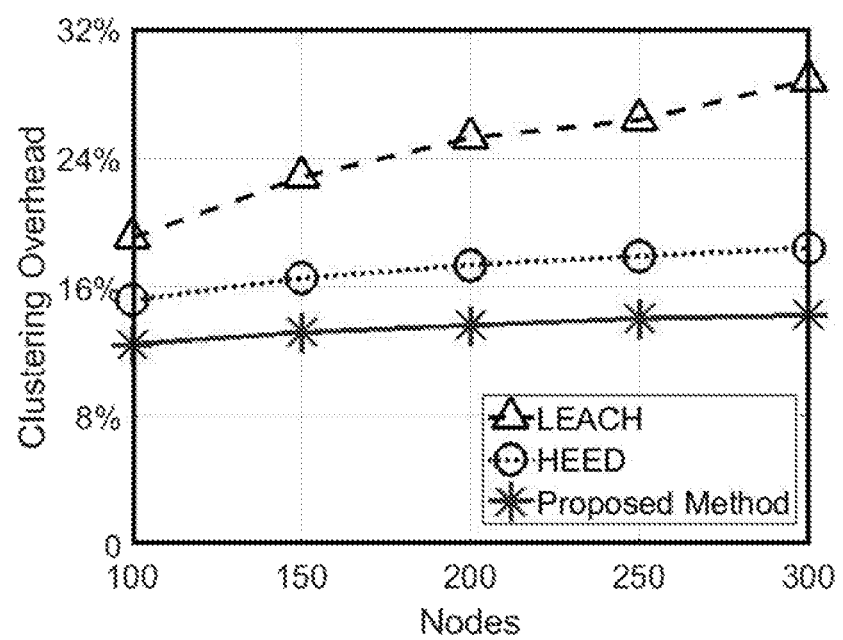
FIG. 8A is a chart of clustering energy overhead for three different clustering methods performed on various number of nodes.
Figure 8B:
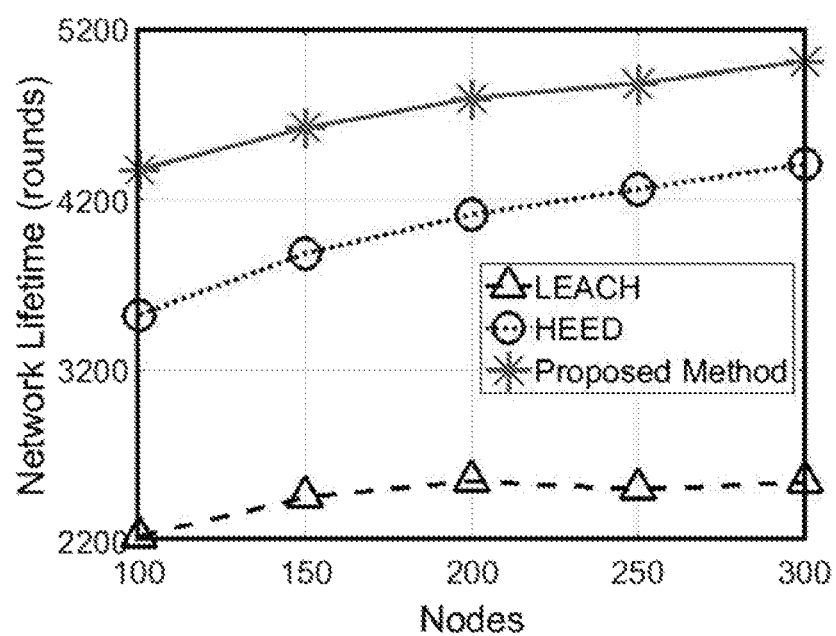
FIG. 8B is a chart of network lifetime for three different clustering methods for networks having different numbers of nodes.

Computer simulation results of an example clustering process performed according to the decentralized clustering method discussed herein will be described with reference to FIGS. 8A-8B. In the simulation, the decentralized clustering method proposed herein was compared with well-known clustering methods: hybrid energy-efficient distributed ("HEED") clustering and low-energy adaptive clustering hierarchy ("LEACH").

The clustering method in LEACH is distributed and the cluster heads are selected using a random function. Simplicity of use is one of the main advantages of LEACH. However, when a node is selected as the cluster head, it informs all nodes in the network by sending a message to all nodes. This results in significant use of the nodes' energy in the selection process for the cluster heads.

The clustering method in HEED is different from the method used in LEACH. A combination of the remaining energy of the nodes and the cost of intra cluster communication are used in the process of forming HEED clusters by using an iterative mechanism. In each iteration, a random function is employed for selecting the cluster heads.

Computer simulation environment for the example clustering method of FIGS. 8A-8B was set as follows:
Total number of nodes: 100 to 300
Environment: 200 meters long by 200 meters wide
Random distribution of each node in the sensing area
Data packet size: 100 bytes and the control packet size: 25 bytes
Initial energy of each node: a random value in the interval of 2-4 Jules Given the above simulation environment, FIG. 8A depicts the clustering energy overhead of each of the three clustering methods for various number of nodes. Clustering energy overhead refers to the amount of energy consumed in the clustering process as related to total energy consumption during the network lifetime. As shown in the chart of FIG. 8A, by using the disclosed decentralized clustering method, in comparison with HEED and LEACH, the overhead of the clustering process imposed on the nodes is reduced by at least 18%. The main reason is that the decentralized clustering method, compared to the other two methods, requires fewer number of messages exchanged to form the clusters. Therefore, one of the basic weaknesses of clustering approaches in wireless sensor networks which is clustering energy overhead is addressed by the method disclosed herein. It should be noted that the score of each node in the example simulation of FIGS. 8A-8B was calculated based on its remaining energy.

Network lifetime of the simulated clustering methods was investigated by the HNA (half of the nodes are alive) metric according to number of rounds. FIG. 8B depicts the network lifetime for the three different clustering methods for networks having different numbers of nodes (100 to 300). The round number for network lifetime is shown in this figure. FIG. 8B shows that, compared to HEED and LEACH, the disclosed method increases network lifetime by at least 14%. In addition, comparing network lifetime for a number of nodes indicates that with increasing number of nodes, the lifetime of the network in the disclosed method is not reduced. As a result, the disclosed clustering method is a scalable to large networks.

Figure 9:
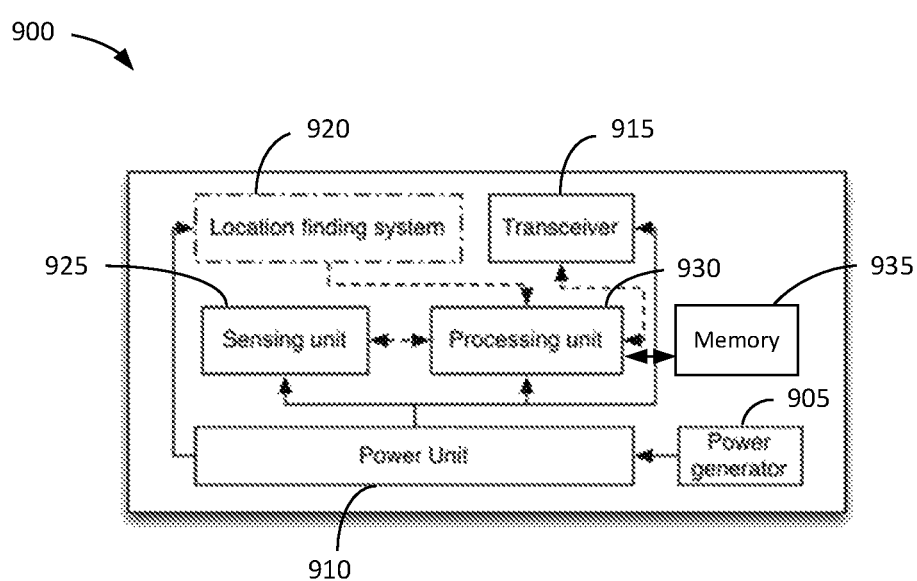
FIG. 9 is a block diagram of an examplary node upon which aspects of this disclosure may be implemented.

FIG. 9 is a block diagram showing an example node 900 upon which aspects of this disclosure may be implemented. Node 900 illustrates an example node in a network such as network 100 of FIG. 1. In one implementation, the node 900 includes a transceiver 915 or other communication mechanism for communicating information, and a processor 930 coupled with the transceiver 915 for processing information. Transceiver 915 may include a communication interface for two-way data communication coupling to a network link connected to the network.

Node 900 also includes a memory 935, such as a random-access memory (RAM) or other dynamic storage device, coupled to processor 930 for storing information and instructions to be executed by the processor 930. Main memory 935 also may be used for storing temporary variables or other intermediate information during execution of instructions to be executed by processor 930. The node 900 can implement, for example, one or more steps of the method 200 for decentralized clustering presented in the current disclosure Memory 935 can also include a read only memory (ROM) or other static storage device for storing static information and instructions for processor 930. For example, memory 935 can include a storage device, such as a flash or other non-volatile memory for storing information and instructions.

In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Node 900 also includes a power generator 905 such as, a solar power generator for providing power to the power unit 910 that supplies the energy to the remaining elements of the node 900. This may be done by, for example, charging the power unit 910, which may include a battery. Node 900 may also include a location finding system such as a global positioning system (GPS) for identifying the location of the node at any given time. Additionally, the node 900 may include a sensing unit 900 for sensing (i.e., collecting data about) one or more parameters of the environment. For example, the sensing unit 925 may include temperature sensor, accelerometers, motion sensors and the like for collecting information about the sensing environment. This information may then be processed via the processing unit and transmitted via the transceiver 915. It should be noted that FIG. 9 is a simplified block diagram of an exemplary node. A node may also include many other units and elements for performing various other functions.

It should be noted that although in some of the examples provided, network nodes are homogeneous, they do not need to be. The present disclosure can also be used for heterogeneous networks. In addition, the techniques presented herein are not affected by the uneven distribution of node energies used in some applications. The decentralized clustering method disclosed herein can be used in a wide range of applications, such as health care and environmental monitoring, and many others.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A method for clustering a wireless network having at least a first node and a second node, the method comprising:
    calculating via a processor of the first node a score for the first node, the score being calculated based on one or more predetermined criteria for the first node, wherein the score indicates a suitability of the first node for being a cluster head;
    calculating via the processor of the first node a waiting time for the first node, the waiting time being calculated based on the score of the first node and the waiting time being inversely proportional to the score;
    setting to empty via the processor a cluster head field of the first node;
    determining via the processor if a message is received over the wireless network and at the first node during at least one of a clustering period or the waiting time of the first node;
    upon receiving the message over the wireless network and at the first node, determining via the processor if the message is a cluster head message from the second node;
    upon receiving a cluster head message from the second node, storing in a storage medium of the first node information contained in the cluster head message from the second node into the cluster head field;
    determining via the processor if the cluster head field is empty after the end of the waiting time of the first node;
    upon determining that the cluster head field is empty after the end of the waiting time of the first node, sending via the first node a cluster head message to the second node and setting the first node as a cluster head; and
    upon determining that the cluster head field of the first node is not empty at an end of a clustering period, setting via the processor the first node as a regular member of a cluster in the wireless network.

2. The method of claim 1, wherein the clustering period is a predetermined amount of time during which the method should be completed.

3. The method of claim 1, further comprising determining if the message received at the first node is a cluster head release message from the second node and removing the information from the second node stored in the cluster head field from the cluster head field, upon determining that the message received is a cluster head release message.

4. The method of claim 1, wherein the information contained in the cluster head message includes a node number and a node score for the second node.

5. The method of claim 1, further comprising waiting for a predetermined amount of time upon sending the cluster head message to the second node.

6. The method of claim 5, wherein the predetermined amount of time equals an amount of time required to send and receive a message at the first node.

7. The method of claim 5, further comprising determining if a cluster head message is received from the second node concurrent with the cluster head message sent from the first node.

8. The method of claim 7, further comprising upon receiving a cluster head message from the second node concurrent with the cluster head message from the first node, determining which one of the first node and the second node has a higher priority.

9. The method of claim 8, further comprising selecting a node with the higher priority as the cluster head and inserting information received from the cluster head message of the node with the higher priority in a cluster head field of a node with lower priority and sending a cluster head release message to one or more nodes in a vicinity of the first node.

10. The method of claim 9, wherein the priority is determined based on a number of the node.

11. The method of claim 1, further comprising forming a cluster with one or more nodes in a vicinity of the first node.

12. The method of claim 11, wherein the cluster only has one cluster head.

13. The method of claim 11, further comprising selecting a node, based on the information stored in the cluster head field, as a next hop to connect to a cluster head node of the first node, upon determining that the first node is as regular member.

14. The method of claim 13, wherein selecting a node from the information stored in the non-empty cluster head field is performed based on the one or more predetermined criteria for the first node.

15. The method of claim 14, wherein selecting a node from the information stored in the non-empty cluster head field is performed based on the score for the first node.

16. A node in a wireless network having at least a first node and a second node, the node comprising:
a processing unit; and
a memory readable by the processing unit and comprising instructions stored thereon to cause the processing unit to:
calculate a score for the first node, the score being calculated based on one or more predetermined criteria for the first node, wherein the score indicates a suitability of the first node for being a cluster head;
calculate a waiting time for the first node, the waiting time being calculated based on the score of the first node and the waiting time being inversely proportional to the score;
set to empty a cluster head field of the first node;
determine if a message is received over the wireless network and at the first node during at least one of a clustering period or the waiting time of the first node;
upon receiving the message over the wireless network and at the first node, determine if the message is a cluster head message from the second node;
upon receiving a cluster head message from the second node of the wireless network, store in the memory information contained in the cluster head message from the second node into the cluster head field;
determine if the cluster head field is empty after the end of the waiting time of the first node;
upon determining that the cluster head field is empty after the end of the waiting time of the first node, send a cluster head message to the second node and set the first node as a cluster head; and
upon determining that the cluster head field of the first node is not empty at an end of a clustering period, set the first node as a regular member of a cluster in the wireless network.

17. The node of claim 16, wherein the clustering period is a predetermined amount of time during which the method should be completed.

18. The node of claim 16, wherein the memory comprises instructions stored thereon to cause the processing unit to further determine if the message received at the first node is a cluster head release message from the second node and remove the information from the second node stored in the cluster head field from the cluster head field, upon determining that the message received is a cluster head release message.

* * * * *